Patented Jan. 24, 1939

2,145,110

UNITED STATES PATENT OFFICE 2,145,110

ESTERS OF CELLULOSE CONTAINING RADICALS OF THE ACIDS OF TETRAHYDROFURANE AND ITS DERIVATIVES AND THEIR PREPARATION

Joseph B. Dickey and James G. McNally, Rochester, N. Y., assignors to Eastman Kodak Company, Rochester, N. Y., a corporation of New Jersey No Drawing. Application June 17, 1937, Serial No. 148,732

11 Claims. (Cl. 260—101)

This application relates to the preparation of cellulose esters by treating an esterifiable cellulosic material with an agent which introduces the radicals of an acid of tetrahydrofurane or of its derivatives in the presence of an acylation catalyst. This acylating agent may be either the chloride or the anhydride of the acid, the radicals of which are to be attached to the cellulosic material.

The degree of esterification by the agents supplying tetrahydrofuroyl groups or the like may be regulated by the proportion of that agent employed. If desired, other acyl groups may be introduced at the same time by having present in the reaction mixture an additional acylating agent. For instance, if desired, the cellulosic material may be a partially esterified or partially etherified cellulose. Also, if desired, the cellulose may first be esterified with the tetrahydro acid and then further esterified with some other acylating agent. For example, some of the acyl groups which may be present either by introducing them before treating with the acylating agents of the present invention, during that treatment or thereafter, are benzoyl, phenylacetyl, furoyl, acetyl, propionyl, oleyl, stearyl, crotonyl, butyryl, etc. These groups may be introduced by the use of the acid chloride or by the acid anhydride, as will be more fully pointed out in the examples.

Representative acids of tetrahydrofurane and its derivatives which furnish radicals which combine with cellulose are tetrahydrofuroic acid and tetrahydrofurfuryloxyacetic acid. The following examples illustrate the preparing of cellulose esters in accordance with our invention:

Example I 5 pounds of cotton linters was heated at 125–130° C. for 5 hours with a mixture of 100 pounds of pyridine, 100 pounds of dichlorobenzene and 28 pounds of tetrahydrofurfuryloxyacetyl chloride. A heavy gel resulted which was diluted with a mixture of methanol and acetone and the ester formed was then separated from the other materials by precipitating into methanol. The ester formed was purified by extracting with ether. The product was found to be soluble in ethylene chloride and upon analysis showed that it was the tritetrahydrofurfuryloxyacetate of cellulose.

Example II 5 pounds of cotton linters was heated for 5 hours at 125–130° C. with a mixture of 100 pounds of pyridine, 100 pounds dichlorobenzene and 20 pounds of 5-methyl tetrahydrofurfuryloxyacetyl chloride. A gel resulted which was diluted with methanol-acetone and precipitated and extracted, as described in Example I. Upon analysis the product proved to be the di-ester.

Example III 5 pounds of cotton linters was heated for 5 hours at 125–130° C. with a mixture of 100 pounds of pyridine, 100 pounds of dichlorobenzene and 8 pounds of tetrahydrofurfuryloxyacetyl chloride. The same procedure was followed as in Example I. Upon analysis the product was found to be the mono-ester.

Example IV 5 pounds of cotton linters was heated for 5 hours at 125–130° C. with a mixture of 100 pounds of pyridine, 100 pounds of dichlorobenzene, 17 pounds of tetrahydrofurfuryloxyacetyl chloride and 4.5 pounds of acetyl chloride. The resulting gel was worked up in the same manner as described in Example I. Upon analysis the product showed that it was cellulose mono-acetate ditetrahydrofurfuryloxyacetate.

Example V 5 pounds of cotton linters was heated for 5 hours at 125–130° C. with 100 pounds of pyridine, 100 pounds of dichlorobenzene, 90 pounds of 5-methyl-tetrahydrofurfuryloxyacetyl chloride and 10 pounds of propionyl chloride. The ester was separated from the resulting gel in the manner described in Example I. Upon analysis the product showed that it was the mono-5-methyl-tetrahydrofurfuryloxyacetate dipropionate of cellulose. In place of propionyl chloride a mixture of acetyl and propionyl chloride could be employed.

Example VI 10 pounds of cellulose mono-tetrahydrofurfuryloxyacetate was added to a mixture of 100 pounds of acetic acid, 1 pound of phosphoric acid and .5 pound of sulfuric acid. 30 pounds of acetic anhydride was added and the mixture was heated to 40–50° C. The reaction was allowed to continue until the cellulosic material passed completely into solution. The ester was precipitated by pouring into methanol and upon analysis showed that it was the mono-tetrahydrofurfuryloxyacetate diacetate of cellulose. Instead of acetic anhydride, a mixture of anhydrides, such as acetic and propionic; acetic and butyric; acetic, propionic and valeric may be employed. Also, if desired, an anhydride together with a lower fatty acid might be employed, such as a mixture of acetic anhydride and propionic acid or acetic anhydride and butyric acid.

Example VII 10 pounds of cellulose mono-propionate was heated for 24 hours at 40–45° C. with a mixture of 10 pounds of tetrahydrofurfuryloxyacetic acid, 1 pound of phosphoric acid, .5 pound of sulfuric acid and 50 pounds of tetrahydrofurfuryloxyacetic acid. The cellulosic material passed into solution. The ester was precipitated from the reaction mixture by pouring into methanol. Upon analysis the product was found to be a mono-propionate ditetrahydrofurfuryloxyacetate of cellulose. Instead of cellulose mono-propionate, the monobenzoate, monophenoxyacetate, monosalicylate or monocrotonate might be employed.

Example VIII 10 pounds of the mono-ethyl-ether of cellulose was heated for 5 hours at 10°–130° C. with a mixture of 200 pounds of pyridine, 200 pounds of dichlorobenzene and 45 pounds of tetrahydrofurfuryloxyacetyl chloride. The resulting heavy gel was worked up by diluting with a mixture of methanol and acetone and was then precipitated by pouring into methanol. The ether ester formed was purified by extraction with ether. Analysis showed the product to be a monoether di-ester of cellulose.

Example IX 8 pounds of the monobenzyl ether of cellulose was heated for 5 hours at 100–130° C. with a mixture of 100 pounds of pyridine, 100 pounds of dichlorobenzene, 14 pounds of tetrahydrofuroyl chloride and 4.5 pounds of acetyl chloride. The product was isolated, as described in the previous example. In place of benzyl ether other ethers, such as the phenyl, tetrahydrofurfuryl, butyl, cetyl, oleyl, phenoxyethyl, methoxymethyl, etc. may be employed.

Example X 8 pounds of cellulose mono-phenyl, mono-ethyl ether was heated for 24 hours at 40–50° C. with a mixture of 100 pounds of tetrahydrofurfuryloxyacetic acid, 30 pounds of tetrahydrofurfuryloxyacetic anhydride and 1 pound of phosphoric acid. The resulting product was isolated from its reaction mixture in the manner described in the preceding examples.

Example XI 5 pounds of cotton linters was heated for 5 hours at 130° C. with a mixture of 100 pounds of pyridine, 100 pounds of dichlorobenzene and 20 pounds of tetrahydrofuroyl chloride. The resulting heavy gel was diluted with methanol-acetone and isolated by pouring into methyl alcohol. The ester was purified by extraction with ether. The product was found to be soluble in ethylene chloride and analyzed for the tri-ester.

Example XII 5 pounds of cotton linters was heated for 5 hours at 125–130° C. with a mixture of 100 pounds of pyridine, 100 pounds of dichlorobenzene and 14 pounds of tetrahydrofuroyl chloride. The product was insolated from its reaction mixture, as described in the preceding example. Analysis showed the compound to be the di-ester.

Example XIII 5 pounds of cotton linters was heated for 5 hours at 125–130° C. with a mixture of 100 pounds of pyridine, 100 pounds of dichlorobenzene and 7 pounds of tetrahydrofuroyl chloride. The resulting ester was isolated from its reaction mixture in the manner described in Example XI. Analysis showed the product to be the mono-ester.

Example XIV 5 pounds of cotton linters was heated for 5 hours at 125–130° C. with a mixture of 100 pounds of pyridine, 100 pounds of dichlorobenzene, 14 pounds of tetrahydrofuroyl chloride and 4.5 pounds of acetyl chloride. The ester formed was isolated from its reaction mixture in the same manner described in Example XI. Analysis showed the product to be cellulose di-tetrahydrofuroate mono-acetate. Instead of acetyl chloride, other acid chlorides, such as propionyl, butyryl, crotonyl, benzoyl, furoyl chloride, etc. may be employed.

Example XV 5 pounds of cotton linters was reacted with a mixture of 100 pounds of pyridine, 100 pounds of dichlorobenzene, 7 pounds of tetrahydrofuroyl chloride and 10 pounds of propionyl chloride in the same manner as described in Example XI. The analysis showed the product to be the mono-tetrahydrofuroate dipropionate of cellulose.

Example XVI 10 pounds of cellulose mono-tetrahydrofuroate was added to a mixture of 100 pounds of acetic acid, 1 pound of phosphoric acid and .4 pound of sulfuric acid. 30 pounds of acetic anhydride was then added and the mixture was heated to 40–45° C. The reaction continued until the reaction product passed completely into solution. The ester was then precipitated by pouring into methanol and analyzed approximately for the mono-tetrahydrofuroate diacetate of cellulose. Other esters, such as, for example, the diproprionate, dibutyrate, dicrotonate, etc. may be prepared in an analogous manner.

Example XVII 10 pounds of cellulose mono-propionate was heated for 24 hours at 40–45° C. with a mixture of 100 pounds of tetrahydrofuroic acid, 1 pound of phosphoric acid, .5 pound of sulfuric acid and 40 pounds of tetrahydrofuroic anhydride. The ester was precipitated into methanol and was found upon analysis to be cellulose mono-propionate ditetrahydrofuroate. In place of cellulose mono-propionate, the other mono-esters of cellulose, such as acetate, butyrate, valerate, stearate, naphthenate, furoate, benzoate, etc. may be employed.

Example XVIII 10 pounds of cellulose mono-ethyl ether was heated for 5 hours at 130° C. with a mixture of 200 pounds of pyridine, 200 pounds of dichlorobenzene and 40 pounds of tetrahydrofuroyl chloride. The product was isolated, as described above. Analysis showed it to be approximately the mono-ether di-ester of cellulose.

Example XIX 8 pounds of the monobenzyl ether of cellulose was reacted with a mixture of 100 pounds of pyridine, 100 pounds dichlorobenzene, 14 pounds of tetrahydrofuroyl chloride and 4.5 pounds of acetyl chloride in the manner described in Example XVIII. Analysis showed the product to be a mono-ether acetate tetrahydrofuroate of cellulose. Other mono-ethers may be employed instead of benzyl ethers and other acid chlorides may be employed instead of acid chloride, if desired.

*Example XX*

8 pounds of cellulose mono-phenyl mono-ethyl ether was heated for 24 hours at 40–50° C. with a mixture of 100 pounds of tetrahydrofuroic acid, 25 pounds of tetrahydrofuroic anhydride, 1 pound of phosphoric acid and .5 pound of sulfuric acid. The product was isolated, as described above. Analysis showed the product to contain phenyl, ethyl and tetrahydrofuroyl groups. Boron trifluoride may be employed, as the catalyst, instead of the mixture of phosphoric and sulfuric acid.

Tetrahydrofuroic acid may be prepared by hydrogenating sodium furoate using nickel as the catalyst, such as described in British Patent No. 435,461 or by hydrogenating an ester of fluoric acid, such as the ethyl ester with nickel as the catalyst followed by hydrolysis to form the acid therefrom. Tetrahydrofuroyl chloride may be prepared by treating sodium tetrahydrofuroate or tetrahydrofuroic acid with thionyl chloride, phosphorus pentachloride, or the like. Tetrafurfuryloxyacetic acid may be prepared by treating the metal derivative of tetrahydrofurfuryl alcohol with a suitable halogenated acid. For instance, tetrahydrofurfuryl alcohol may be reacted with an alkali metal or an alkali metal hydroxide to form the derivative and this compound may be treated with chloroacetic acid in a suitable solvent, such as pyridine, butanol, or the like. Other acids of tetrahydrofurane derivatives may be employed, such as those in which one or more of the hydrogen groups are replaced by other substituents.

The cellulose esters prepared in accordance with my invention may be employed to prepare sheets, artificial yarn or for use in impregnating or lacquering compositions. Sheeting may be employed in various laminated products, such as for laminating glass, fabrics, metals, or the like.

We claim:—

1. A cellulosic material containing tetrahydrofuroyl groups combined with the cellulose.

2. A cellulosic material containing tetrahydrofurfuryloxyacetyl groups combined with the cellulose.

3. An organic acid ester of cellulose containing fatty acid groups and tetrahydrofuroyl groups.

4. An organic acid ester of cellulose containing fatty acid groups and tetrahydrofurfuryloxyacetic acid groups.

5. Cellulose acetate-tetrahydrofuroate.

6. Cellulose acetate-tetrahydrofurfuryloxyacetate.

7. The process of preparing a tetrahydrofuroic acid ester of cellulose which comprises reacting upon an esterifiable cellulosic material with an agent which introduces tetrahydrofuroic acid radicals in the presence of an acylation catalyst.

8. The process of preparing cellulose esters which comprises reacting upon cellulose with an esterifying bath comprising a lower fatty acid chloride, tetrahydrofuroyl chloride and a tertiary organic base.

9. The process of preparing cellulose esters which comprises reacting upon an esterifiable cellulosic material with an acetylating bath comprising a tetrahydrofurfuryloxyacetyl chloride and an acylating catalyst.

10. A cellulosic material containing in combination acyl groups from an acid selected from the group consisting of tetrahydrofuroic acid and tetrahydrofurfuryloxyacetic acid.

11. An organic acid ester of cellulose containing fatty acid groups and acyl groups selected from the groups consisting of tetrahydrofuroic acid and tetrahydrofurfuryloxyacetic acid.

JAMES G. McNALLY.
JOSEPH B. DICKEY.